UNITED STATES PATENT OFFICE.

WALTER O. SNELLING, OF PITTSBURGH, PENNSYLVANIA.

WATER PURIFICATION.

1,325,213.     Specification of Letters Patent.     Patented Dec. 16, 1919.

No Drawing.     Application filed July 31, 1915. Serial No. 42,962.

*To all whom it may concern:*

Be it known that I, WALTER O. SNELLING, a citizen of the United States, and a resident of Pittsburgh, in the county of Allegheny and State of Pennsylvania, have invented a new and useful Improvement in Water Purification, of which the following is a specification.

My invention relates to the softening and purification of industrial and potable waters, and it has for one of its objects to provide novel, cheap and highly effective water-softening agents.

Another object of my invention is to provide a simple and inexpensive process of preparing water-softening agents of the above-indicated character from ordinary Portland cements.

A further object of my invention is to impart to my improved water-softening agents a high degree of porosity, whereby their maximum reactive strength is made available.

It has been known for many years that certain alumino-silicates, such as the natural and artificial zeolites, have a replaceable action with respect to the metals of the alkali alkaline earth and other groups. That is to say, they possess the property of extracting such metals from solutions of their salts, and of yielding up equivalent amounts of the metals which they themselves contain. Thus the alkali-metal zeolites are capable of removing calcium and magnesium from solutions containing salts of these metals, and they can thereafter be regenerated by treatment with a solution of an alkali-metal salt, such as sodium chlorid. Much use is therefore made of these zeolites, both natural and artificial, in the softening of hard waters. They are expensive, however, since the natural zeolites are not abundant, while the artificial zeolites are usually made by a fusion process which involves careful manipulation and which is costly.

My present invention aims to produce water-softening agents from Portland cements. This, in a broad sense, is not new, since it is well known that ordinary Portland cements have replaceable action with respect to calcium, magnesium, and the alkali metals. It has long been recognized that the set cement in breakwaters and sea retaining walls enters into chemical reaction with the sea-water, and that it loses calcium and takes up sodium and magnesium. It is also well known, as a laboratory experiment, that Portland cement, poor in lime, will take up additional calcium on being shaken with lime water, and that cement which has long been in contact with sea water will similarly take up calcium on being shaken with a solution of a calcium salt, and at the same time will give up magnesium and sodium.

Furthermore, it has frequently been observed that ordinary Portland cements can be transformed into zeolites by hydration and subsequent treatment with solutions of alkali-metal compounds and other substances. This phenomenon, for example, has been observed where cement structures have been in long-continued contact with hot mineral waters. However, the process steps by which I prepare my water-softening agents, and by which I control the properties of these agents, I believe to be new and original with myself. In particular, I have discovered certain methods of preparing hydration products from cements in the form of porous, friable masses, of great volume in proportion to their weight, in which condition they display their maximum degree of chemical activity, and can readily be treated by any suitable subsequent operation for the preparation of zeolitic masses, or other products having water-softening properties. These process steps, and their products, will be hereinafter described and claimed.

In carrying out one modification of my process, I treat ordinary Portland cement with a large excess of a hydrating medium, which may variously consist of plain water, a water solution of an acid, a water solution of an alkali-metal compound, or any other aqueous solution that is capable of withdrawing calcium from the cement. It is desirable to employ a large excess of the hydrating medium, in order that the hydrated product may not be allowed to set to a solid mass, and in order that the product may be as voluminous as possible.

According to this method, I agitate an ordinary dry Portland cement in the selected hydrating medium, stirring the mixture, either mechanically or by boiling, so as to maintain the cement particles in suspension until the hydration is substantially complete. I prefer to boil the mixture, and it may be necessary to continue the treatment for several hours. The resulting material, which is a very voluminous powder, usually having several times the volume of the original cement, is then removed from the liquid by settling and decantation, or by filtering. This method of hydration may be varied by using steam as the hydrating agent, and any other method may be employed which yields a non-coherent, finely divided, hydrated mass.

The finely-divided product, however prepared, is next agglomerated with a suitable binder, in order to facilitate its further treatment. I find that this agglomeration may be conveniently accomplished by mixing the thoroughly hydrated cement powder with a little additional cement, mixed with enough water to enable the added cement to set, the resulting solid mass being rather friable, and being easily broken into fragments of any desired size. These fragments or lumps, upon standing, become firmer in consistency, so that they do not tend to break up in their subsequent treatment and use.

If the cement has not been originally hydrated with a liquid capable of withdrawing calcium from the cement, such as an acid or an alkali-metal compound, the agglomerated and ground material should next be treated to remove a considerable amount of its constituent calcium. Several different methods may be employed for this purpose, one of which consists in treating the hydrated material with an acid, either mineral or organic, which decomposes the hydrated compounds formed from the cement and takes up the calcium in soluble form. Another method consists in treating the cement product with one of a group of reagents including soluble sulfates, carbonates, oxalates and other soluble salts. These reagents withdraw a portion of the calcium from the cement material, in the form of calcium sulfate, calcium carbonate, calcium oxalate, and the like, which are difficultly soluble compounds, and which may be removed by means of any suitable solvents, according to usual and well known methods.

My porous products may be treated by any suitable methods for increasing their replaceable properties, and such treatment may, if desired, consist in transforming the cement either partially or entirely into zeolites, which may readily be made by introducing into the porous, hydrated product a considerable amount of alkali-metal radicals. This may be done by boiling the product for some time with an excess of sodium carbonate, or other suitable alkali-metal compound which replaces a portion of the calcium of the cement with sodium, forming a mixture of sodium silicate and sodium aluminate. It is well known that mixed alkali-metal silicates and aluminates will react at about 180° C. in the presence of $CO_2$, to form zeolites, and these conditions are substantially paralleled when my cement masses are heated with an alkali-metal compound. This treatment produces a final product which has a very strong replaceable action with respect to calcium and magnesium.

If the cement is originally hydrated with a calcium-removing liquid, either an acid or a solution of an alkali compound, the subsequent treatment is of course to be modified accordingly, the calcium being preferably removed as calcium chlorid, or in some other soluble form.

According to another modification of my process, I mix an ordinary Portland cement with water and expose the mixture to a low temperature, preferably about the freezing point of water. Cement will not set properly at such a temperature, but hydrates and becomes loosely aggregated, and the resulting product is a friable, easily crushed, hydrated mass, very suitable for further treatment in the preparation of water-softening agents. This method may also be employed for treating a mixture of fresh cement and the light hydrated products made by treating cement with a large excess of a hydrating agent. In such case, the fresh cement will tend to hydrate incompletely and a friable product will result.

According to a still further modification of my process, which may sometimes be found desirable, I increase the porosity of my products by mixing hydrated or unhydrated Portland cement with a filling material that can be subsequently extracted by means of heat or solvents, forming the mixture into solid masses, and removing the filling material. This step may conveniently be combined with the step, described above, of agglomerating the hydrated cement powder with a binder; or untreated cement may be mixed with the filling material, together with enough water to hydrate and set the cement. The hard mass, produced in either of these ways, is crushed into lumps of any desired size, and the crushed material is treated to remove the filler, leaving porous bodies of hydrated cement, which may later be treated by any of the methods described above, or otherwise, for the production of porous water-softening agents. The filling material may, for example, be sawdust, which is readily burned out of the crushed cement at a comparatively low temperature. Soluble substances may also be employed as fillers, and afterward dissolved out of the crushed cement by means of suitable solvents. I have obtained good results by using naphthalene in this manner, and extracting it with gasolene.

The products obtained in accordance with my invention are much more active and efficient water-softening agents than are the natural zeolites, and I attribute this mainly to the very great porosity of my products, and the large surface which they consequently present to the water filtered through them. My products may be utilized in the same manner as the natural and artificial zeolites, being placed in layers of suitable thickness, through which the water to be softened may be filtered with considerable rapidity. These materials, like ordinary zeolites, may be regenerated after use by treatment with a strong and preferably hot solution of sodium chlorid or other suitable alkali metal compound.

The process steps and materials specifically set forth above may be modified in many particulars without departing from the spirit and scope of my invention, and it is therefore to be understood that no limitations are to be imposed upon my invention unless indicated in the appended claims.

I claim as my invention:

1. In the preparation of water-softening agents from cement, the step that consists in hydrating Portland cement in a sufficient amount of a hydrating agent to prevent the cement particles from uniting to form a cohesive mass.

2. In the preparation of water-softening agents from cement, the step that consists in hydrating Portland cement in an excess of a liquid containing a substance capable of withdrawing calcium from the cement.

3. In the preparation of water-softening agents from cement, the step that consists in hydrating Portland cement in an excess of a solution of an alkali-metal salt.

4. In the preparation of water-softening agents from cement, the step that consists in hydrating Portland cement under such conditions that the cement particles hydrate without attachment to adjacent particles.

5. As a step in the preparation of water-softening agents from cement, the process that comprises hydrating Portland cement while maintaining it in a finely-divided condition and agglomerating the finely-divided material.

6. As a step in the preparation of water-softening agents from cement, the process that comprises hydrating Portland cement while maintaining it in a finely-divided condition, agglomerating the finely-divided material, and subdividing the resulting mass.

7. As a step in the preparation of water-softening agents from cement, the process that comprises hydrating Portland cement while maintaining it in a finely-divided condition, agglomerating the finely-divided material by means of a binder, and crushing the resulting mass into fragments.

8. As a step in the preparation of water-softening agents from cement, the process that comprises agitating Portland cement in an excess of an aqueous liquid, to hydrate the cement without permitting it to set into a solid mass, separating the hydrated, finely-divided material, and agglomerating the said material.

9. As a step in the preparation of water-softening agents from cement, the process that comprises agitating Portland cement in an excess of a solution capable of withdrawing calcium therefrom, to hydrate the cement without permitting it to set, separating the hydrated, finely-divided material and agglomerating the said material.

10. As a step in the preparation of water-softening agents from cement, the process that comprises agitating Portland cement in an excess of an aqueous liquid, to hydrate the cement without permitting it to set to a solid mass, separating the hydrated, finely-divided material, adding thereto an additional amount of cement, permitting the mass to solidify, and crushing the resulting material into fragments.

11. As a step in the preparation of water-softening agents from cement, the process that comprises preparing hydrated Portland cement of less specific gravity than normal set cement, and extracting a portion of the constituent calcium from the said hydrated cement.

12. As a step in the preparation of water-softening agents from cement, the process that comprises hydrating Portland cement in a finely-divided condition, agglomerating the finely-divided material, and removing a portion of the constituent calcium from the agglomerated material.

13. As a step in the preparation of water-softening agents from cement, the process that comprises hydrating Portland cement in a finely-divided condition, agglomerating the finely-divided material by means of a binder, crushing the resulting mass into fragments, and removing a portion of the constituent calcium from the crushed material.

14. As a step in the preparation of water-softening agents from cement, the process that comprises agitating Portland cement in an excess of an aqueous liquid, to hydrate the cement without permitting it to set, separating the hydrated, finely-divided material, adding thereto an additional amount of cement, permitting the mass to solidify, crushing the resulting material into fragments, and removing a portion of the constituent calcium therefrom.

15. As a step in the preparation of water-softening agents from cement, the process that comprises preparing hydrated Portland cement of less specific gravity than normal set cement, extracting a portion of the calcium from the said hydrated cement, and adding material capable of replacing hardness in natural waters.

16. As a step in the preparation of water-softening agents from cement, the process that comprises hydrating Portland cement in a finely-divided condition, agglomerating the finely-divided material, removing a portion of the constituent calcium from the agglomerated material, and adding material capable of replacing hardness in natural waters.

17. As a step in the preparation of water-softening agents from cement, the process that comprises hydrating Portland cement in a finely-divided condition, agglomerating the finely-divided material by means of a binder, crushing the resulting mass into fragments, removing a portion of the constituent calcium from the crushed material, and adding material capable of replacing hardness in natural waters.

18. As a step in the preparation of water-softening agents from cement, the process that comprises agitating Portland cement in an excess of an aqueous liquid, to hydrate the cement without permitting it to set to a solid mass, separating the hydrated, finely-divided material, adding thereto an additional amount of cement, permitting the mass to solidify, crushing the resulting material into fragments, removing a portion of the constituent calcium therefrom, and adding material capable of replacing hardness in natural waters.

19. As a step in the preparation of water-softening agents from cement, the process that comprises hydrating Portland cement in a finely-divided condition, mixing the finely-divided material with a binder and a filler, compacting the said material, subdividing the compacted mass and removing the said filler.

In testimony whereof, I have hereunto subscribed my name this 28th day of July, 1915.

WALTER O. SNELLING.

Witnesses:
M. R. McKEOWN,
J. G. KAISER.